US011700277B2

(12) United States Patent
Raman et al.

(10) Patent No.: US 11,700,277 B2
(45) Date of Patent: Jul. 11, 2023

(54) PROVIDING ACCESS TO DATA IN A SECURE COMMUNICATION

(71) Applicant: SONICWALL INC., Milpitas, CA (US)

(72) Inventors: Raj Raman, San Jose, CA (US); Aleksandr Dubrovsky, Los Altos, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

(21) Appl. No.: 17/166,773

(22) Filed: Feb. 3, 2021

(65) Prior Publication Data

US 2021/0234896 A1  Jul. 29, 2021

Related U.S. Application Data

(63) Continuation of application No. 15/851,108, filed on Dec. 21, 2017, now Pat. No. 10,924,508.

(51) Int. Cl.
  *H04L 29/06*  (2006.01)
  *H04L 9/40*  (2022.01)
  *H04W 12/04*  (2021.01)

(52) U.S. Cl.
  CPC ........ *H04L 63/166* (2013.01); *H04L 63/0435* (2013.01); *H04L 63/0442* (2013.01);
  (Continued)

(58) Field of Classification Search
  CPC .............. H04L 63/166; H04L 63/0435; H04L 63/0442; H04L 63/061; H04L 63/062; H04L 63/20
  See application file for complete search history.

(56) References Cited

U.S. PATENT DOCUMENTS 8,196,147 B1 * 6/2012 Srinivasan .......... H04L 67/2842
  719/310
8,949,569 B2 * 2/2015 Benner ............... G06F 12/0891
  711/118

(Continued)

OTHER PUBLICATIONS

Wu et al., "SCMFS: a file system for storage class memory", SC '11: Proceedings of 2011 International Conference for High Performance Computing, Networking, Storage and Analysis, Nov. 2011.*

(Continued)

*Primary Examiner* — Morshed Mehedi
(74) *Attorney, Agent, or Firm* — Polsinelli LLP

(57) ABSTRACT

The present disclosure is directed to preventing computer data from being usurped and exploited by individuals or organizations with nefarious intent. Methods and systems consistent with the present disclosure may store keys and keying data for each of a plurality of connections in separate memory locations. These memory locations may store data that maps a virtual address to a physical memory address associated with storing information relating to a secure connection. These separate memory locations may have a unique instance for each individual communication connection session, for example each transport layer security (TLS) connection may be assigned memory via logical addresses that are mapped to one or more physical memory addresses on a per-core basis. Such architectures decouple actual physical addresses that are used in conventional architectures that assign a single large continuous physical memory partition that may be accessed via commands that access physical memory addresses directly.

20 Claims, 6 Drawing Sheets

(52) U.S. Cl.
CPC .......... *H04L 63/061* (2013.01); *H04L 63/062* (2013.01); *H04L 63/20* (2013.01); *H04W 12/04* (2013.01)

(56) References Cited

U.S. PATENT DOCUMENTS

| | | | |
|---|---|---|---|
| 9,055,064 B2 | 6/2015 | Kumar et al. | |
| 9,348,751 B2* | 5/2016 | Van Dyke | G06F 12/0292 |
| 10,210,092 B1* | 2/2019 | Miao | G06F 12/0855 |
| 10,924,508 B2 | 2/2021 | Raman | |
| 2005/0033969 A1 | 2/2005 | Kiiveri et al. | |
| 2005/0114688 A1 | 5/2005 | Leis et al. | |
| 2006/0041733 A1* | 2/2006 | Hyser | G06F 12/10 |
| | | | 711/203 |
| 2009/0177843 A1* | 7/2009 | Wallach | G06F 12/0877 |
| | | | 711/131 |
| 2010/0235586 A1* | 9/2010 | Gonion | G06F 12/0831 |
| | | | 711/146 |
| 2011/0161619 A1* | 6/2011 | Kaminski | G06F 12/1027 |
| | | | 711/E12.016 |
| 2012/0089808 A1* | 4/2012 | Jang | G06F 12/1072 |
| | | | 711/206 |
| 2012/0284702 A1 | 11/2012 | Ganapathy | |
| 2013/0219130 A1* | 8/2013 | Zetterman | G06F 15/167 |
| | | | 711/147 |
| 2014/0331297 A1 | 11/2014 | Innes et al. | |
| 2015/0046661 A1* | 2/2015 | Gathala | G06F 12/023 |
| | | | 711/147 |
| 2015/0113264 A1 | 4/2015 | Wang et al. | |
| 2015/0341383 A1 | 11/2015 | Reddy et al. | |
| 2016/0028728 A1 | 1/2016 | Hampel et al. | |
| 2017/0206035 A1* | 7/2017 | Kumar | G06F 3/0656 |
| 2017/0300425 A1* | 10/2017 | Meredith | G06F 12/1027 |
| 2017/0337133 A1 | 11/2017 | Bolbenes et al. | |
| 2019/0042120 A1* | 2/2019 | Kajigaya | G06F 3/0625 |

OTHER PUBLICATIONS

Kemper et al., "HyPer: A hybrid OLTP&OLAP main memory database system based on virtual memory snapshots", IEEE 27th International Conference on Data Engineering, Data of Conference: Apr. 11-16.

U.S. Appl. No. 15/851,108 Final Office Action dated Sep. 10, 2020.

U.S. Appl. No. 15/851,108 Office Action dated Mar. 5, 2020.

* cited by examiner

PROVIDING ACCESS TO DATA IN A SECURE COMMUNICATION

CROSS REFERENCE TO RELATED APPLICATIONS

This application is a continuation and claims the priority benefit of U.S. patent application Ser. No. 15/851,108 filed Dec. 21, 2017, now U.S. Pat. No. 10,924,508, the disclosure of which is incorporated herein by reference.

BACKGROUND OF THE INVENTION

Field of Invention

The present disclosure generally relates to reducing the ability of a hacker to exploit vulnerabilities of a computer system. More specifically, the present disclosure relates to preventing computer data from being usurped and exploited by individuals or organizations with nefarious intent.

Description of the Related Art

One of the greatest threats to computer data security relates to the fact that memory in a computer is often partitioned as a single contagious block. One reason memory is frequently partitioned as a single contiguous block is exemplified by computing system, such as a proxy or firewall needs to scale to control hundreds of thousands of transport layer security (TLS) connections. Typically, the memory where these session keys are stored is in a single logical memory partition, such implementations are sometimes implemented in a system memory that may be a global memory accessible by different processing cores or processing sockets that may contain multiple processing cores. As a packet in-flight traverses a firewall/proxy, the packet pointer is typically handed off to different software modules, like a transfer control protocol (TCP) module, deep packet inspection-secure socket layer (DPI-SSL) module, deep packet inspection (DPI) module, a content filtering module, etc. Having a single system memory that is shared across such modules and connection sessions simplifies the architecture of software programs that access such modules. Such architectures also allow the processors of a computer system to operate more efficiently as those processors may accesses information relating to different connections directly without having to invoke separate processes for each connection.

When such a partitioned computer memory includes information (such as security keys, information that relates to those security keys, and data that may related to secure hypertext protocol (https) connection sessions) to access data stored in that memory may be exploited if data relating to one connection session is accessible to another connection session. An infamous example of such an architectural vulnerability is the "Heartbleed" virus that enabled an attacker to eavesdrop on secure keys, keying material, and sensitive data of multiple different https sessions. This exploit caused memory to be leaked in a way that allowed the attacker to obtain Keys and Keying material of multiple different https connections/sessions.

A first method that may help prevent a hacker from accessing memory associated with another connection session could include assigning a different process for each connection, thus, preventing information from a first connection associated with a first process from accessing information relating to a second process associated with a second connection. This solution, however, introduces significant latency and increases demands on processors that manage these communication connection sessions. As such, by simply assigning different processes for each connection, a computer would be quickly overwhelmed with administrative tasks when managing hundreds of thousands of processes associated with hundreds of thousands of different connection sessions. This is especially true for a man-in-the-middle proxy application in a firewall.

A second method that may help prevent a hacker from accessing memory associated with another connection session could include having a separate hardware security module (HSM) that stores the session keys in a separate hardware module or appliance. In such an instance, the HSM could provide an interface for security applications to invoke crypto operations that run on the HSM, thereby, isolating information from one connection session from another connection session. By isolating connections sessions in this way prevents any particular connection from being accessed by another connections session. While this may be a good solution for multi-domain/multi-tenant cloud infrastructure and Data Centers hosting multiple customer environments, this solution introduces extra costs (the cost of a separate appliance) and complexity that makes the deployment impractical for most firewall and/or proxy deployments. This solution is also not compatible with conventional "run-to-completion" packet processing software architectures that are a commonly found in many proxy/firewall implementations today.

What are needed are new architectures that prevent a hacker from accessing memory associated with different processes or different connections at a computer system via a design flaw or architectural vulnerability without compromising performance or processor efficiency and without increasing the total cost of operating a data center.

SUMMARY OF THE CLAIMED INVENTION

The presently claimed invention relates to a method, a non-transitory computer readable storage medium, or a system executing functions consistent with the present disclosure. A method consistent with the present disclosure may receive an indication that a client device is initiating a secure connection with a computing device. After the initiation of the secured connection has begun, a first packet sent between the client device and the computing device via the secure communication connection may be received, a request to receive handle information associated with the secure communication connection may be sent, and the requested handle information may be received. Next a first packet sent between the client device and the computing device may be received via the secure communication connection, session keys and secure keying material related to the secure communication connection may be created, the created session keys and the secure keying material may be stored in a physical memory, where the created session keys and keying material stored in the physical memory are available to decrypt data included in subsequent data packets associated with the secure communication connection. After the session keys and keying material are stored in the physical memory, a new packet to send to the destination may be created from the data included in the first packet, where the newly created packet secures the data included in the first packet based at least in part on the created session keys, and the newly created packet may be allowed to be sent to a destination.

When the presently claimed invention is implemented as a non-transitory computer readable storage medium by processors executing instructions out of memory may implement methods consistent with the present disclosure. Here again the method consistent with the present disclosure may receive an indication that a client device is initiating a secure connection with a computing device. After the initiation of the secured connection has begun, a first packet sent between the client device and the computing device via the secure communication connection may be received, a request to receive handle information associated with the secure communication connection may be sent, and the requested handle information may be received. Next a first packet sent between the client device and the computing device may be received via the secure communication connection, session keys and secure keying material related to the secure communication connection may be created, the created session keys and the secure keying material may be stored in a physical memory, where the created session keys and keying material stored in the physical memory are available to decrypt data included in subsequent data packets associated with the secure communication connection. After the session keys and keying material are stored in the physical memory, a new packet to send to the destination may be created from the data included in the first packet, where the newly created packet secures the data included in the first packet based at least in part on the created session keys, and the newly created packet may be allowed to be sent to a destination.

A system consistent with the present disclosure may include one or more memories, a plurality of processing cores that execute instructions out of the one or more memories, where each of the processing cores each are associated with a particular data store of plurality of data stores that store translation information. Each of these discrete processing cores in the multi-core system may be associated with one and only one data store that stores translation information relating to a single secure connection. A first processing core of the plurality of processors may receive an indication that a client device is initiating a secure connection with a computing device. After the initiation of the secured connection has begun, a first packet sent between the client device and the computing device via the secure communication connection may be received, a request to receive handle information associated with the secure communication connection may be sent, and the requested handle information may be received. Next a first packet sent between the client device and the computing device may be received via the secure communication connection, session keys and secure keying material related to the secure communication connection may be created, the created session keys and the secure keying material may be stored in a physical memory, where the created session keys and keying material stored in the physical memory are available to decrypt data included in subsequent data packets associated with the secure communication connection. After the session keys and keying material are stored in the physical memory, a new packet to send to the destination may be created from the data included in the first packet, where the newly created packet secures the data included in the first packet based at least in part on the created session keys, and then the newly created packet may be allowed to be sent to a destination.

DETAILED DESCRIPTION

Figure 1:
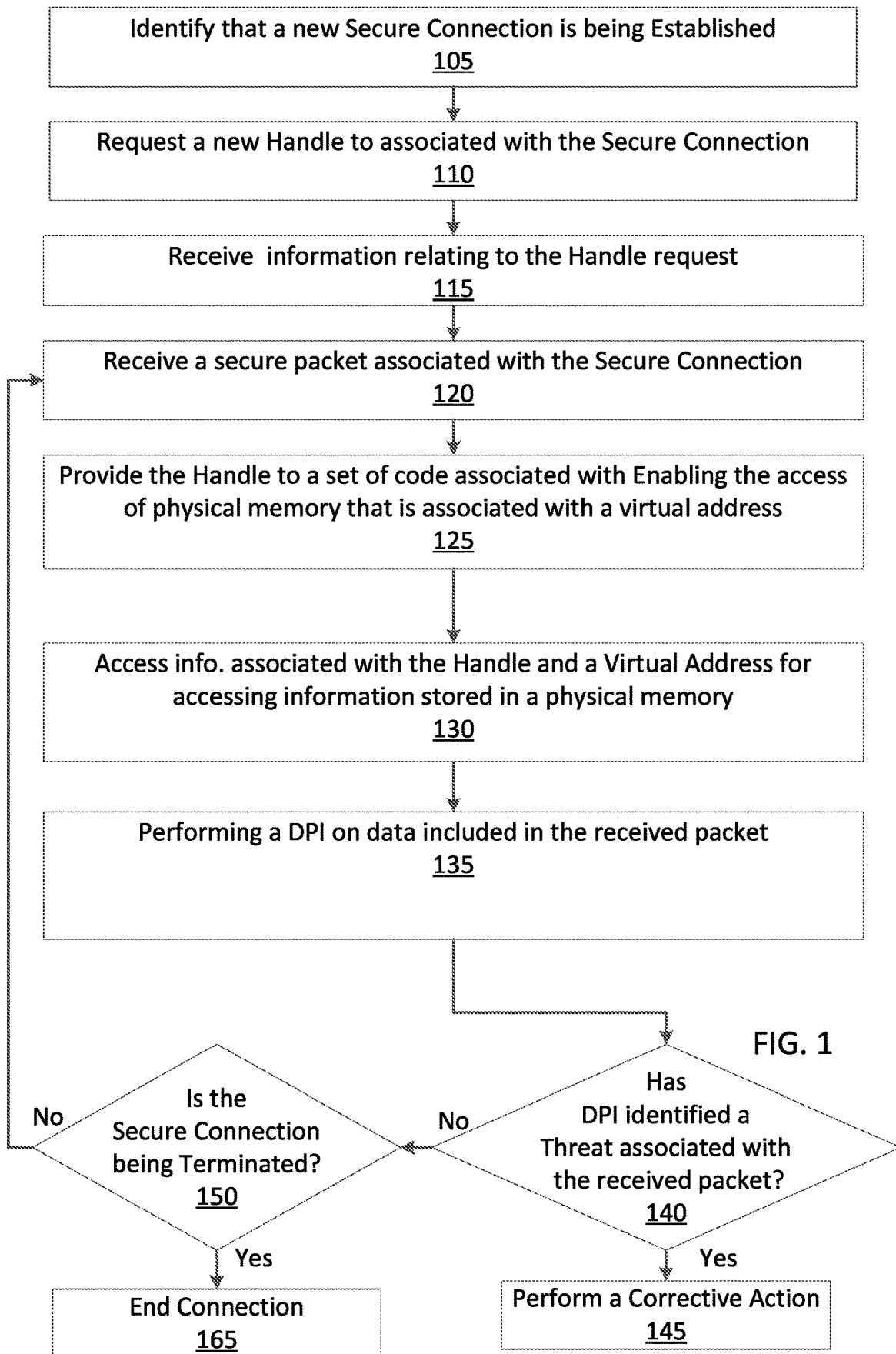
FIG. 1 illustrates an exemplary set of instructions that may be performed at a firewall.

The present disclosure is directed to preventing computer data from being usurped and exploited by individuals or organizations with nefarious intent. Methods and systems consistent with the present disclosure may store keys and keying data for each of a plurality of connections in separate memory locations. These memory locations are addressed via virtual addresses in software that are transparently mapped to physical addresses via a translation mapping that is configured dynamically in a data store associated with a current processing core. This data store is associated with storing information relating to a secure connection. These separate memory locations may have a unique instance for each individual communication connection session, for example, each transport layer security (TLS) connection may be assigned memory via logical addresses that are mapped to one or more physical memory addresses on a per-core basis. Such architectures create separate physical memory partitions that can only be accessed using logical addresses in the current core that is running in the context of a connection to which this physical memory belongs to, unlike a conventional architecture where the process using logical addresses on any core can access all or most of the physical memory available including memory associated with other connections..

Methods and systems consistent with the present disclosure may use a handle to access physical memory via a virtual address. Methods and apparatus consistent with the present disclosure may receive a new handle from low level firmware or other program code during a secure transport layer security/secure socket layer (TLS/SSL) handshake phase when TLS connection between computing devices is being initiated. This new handle may represent a set of continuous physical memory of some size. A handle may be an abstract descriptor or identifier similar to a file descriptor that is associated with a file. Each handle may be associated with a physical address X and a size Y (where Y may be measured in a number of bytes), as such, each handle may be associated with a small amount of contagious memory starting at address X and spanning Y bytes. In certain instances, a handle may be associated with 96 Kilo-Bytes (KB) of memory or with 128 KB of memory, for example. Each handle may also be associated with a virtual address V and a size Y, where virtual address V maps to physical address X and size Y. Obtaining the new handle for this new connection and programming the TLB may each be performed by a processor executing low level firmware. The obtaining of the new handle and the programming of the TLB may be performed via two different low-level APIs that are called by a program at different times. For example, obtaining a new handle usually happens once for a new connection. All subsequent packets use the same handle which is saved by the program and used for this connection.

However, for each packet of this connection, the program will call the low level API to map this handle with a logical address that the program may then use and after a encrypt/decrypt process is completed.

When a new handle is received, meta-data associated with the new connection may be stored. Logical or virtual address information may also be stored with or be associated with this handle. In certain instances, functions associated with a software module that may be referred to as a DPI-SSL program/module that may be used to perform deep packet inspection (DPI) scanning of data associated with different SSL connections. Virtual/logical address information and associated handles may be stored as meta-data where each particular handle and each corresponding set of virtual/logical address information are associated with a single TLS connection. In certain instances, functions relating to accessing secure information and decrypting secure data included in a received packet may be performed by a first processing core at a multi-core processing system, and functions relating to scanning the decrypted packet data may be performed by a second processing core of the multi-core processing system. In such instances, the second processing core may not have access to any secure information stored in physical memory.

When a real-time packet is received by a firewall, for example, the firewall may parse that packet and identify an association with an existing connection. The firewall may also identify a pointer to meta-data associated with that connection when a processor processes that packet. As additional packets are received via this connection, DPI-SSL may obtain the handle from the meta-data associated with this connection for use when accessing physical memory using a virtual/logical address. For example, this handle may be used by an application program interface (API) call to grant or enable access to physical memory locations that are associated with this connection. After a handle is used to grant/enable access to physical memory associated with a connection, DPI-SSL program code may be used to provide a virtual address when accessing data associated with a particular connection that are stored in physical memory.

In certain instances, DPI-SSL may need to access physical memory whenever a DPI-SSL program needs to accesses OpenSSL data related to a secure connection. Since OpenSSL is a software library used in secure communication connections that may implement cryptographic functions and other functions associated with a secure connection, other software programs, such as DPI-SSL may be required to access information associated with OpenSSL. For example, DPI-SSL may access OpenSSL to obtain information regarding encryption or decryption keys associated with a particular connection.

DPI-SSL may not need to access OpenSSL data for all packets. For example, when an acknowledgement (ACK) packet is used to acknowledge the receipt of a TCP packet is received, DPI-SSL will not have to access OpenSSL data because ACK packets do not include encrypted data. As such, DPI-SSL will not make a request for OpenSSL data based on the receipt of a TCP ACK. Additionally, DPI-SSL may not need to access OpenSSL whenever a packet is received that does not include secure data. In contrast, when packets are received that include secure data are received via a TLS connection, DPI-SSL will have to access OpenSSL data. In order to access OpenSSL data associated with this connection DPI-SSL may make a call via a low level API using a handle, where that call may then enable (or grant) DPI-SSL to perform functions associated with that connection. As such, DPI-SSL may access physical memory using virtual memory addresses in order to obtain security keys required to decrypt encrypted data included in a received data packet. Here again, after a handle has been used to enable (or grant) memory access, DPI-SSL may be allowed to provide a virtual address that is mapped to a physical memory address that stores data related to that connection. As such, DPI-SSL program code may maintain a handle H that is associated with a virtual address V spanning Y bytes. In certain instances, registers at a processor, such as transition look aside (TLB) registers may be used to store data relating to a handle and state information that may be used to enable access to physical memory via a virtual address.

Physical memory may be used to store encryption keys, keying data, and other data relating to a particular connection. Such handles may be a reference to a resource, may be a pointer, may be an index that identifies an element in an array or table, or may be an identifier used when a transformation is performed. Handles consistent with the present disclosure may be used to enable memory accesses that transform a virtual address to a physical address. Handles of the present disclosure may be associated with entries in a secure memory vault (SMV), a particular handle and a logical address associated with that handle may be used to access information stored in physical memory when an address is transformed. Furthermore, based on a convention (or rule) a particular memory location associate with the handle may be a memory location where a key for a first connection is stored, where a next incremental memory location is understood (based on the rule) to contain data relating to that key and first connection. In such an instance, a third incremental memory location may be understood (based on the rule) to store other data relating to the first connection.

A secure memory vault (SMV) consistent with the present disclosure may be logically and/or be physically separate from system memory or from a global memory associated with a computing system. SMV represents a contiguous chunk of bytes, for example 68K bytes or 128K bytes, of physical memory that can only be accessed after the local data store on this core (TLB) is programmed with the logical address to physical address mapping and enabling access to this physical memory. For example, the local data store may be stored in a set of computer registers (such as TLB registers) or be stored in another memory. When an SMV consistent with the present disclosure is implemented in memories locally accessible a processor, data stored in those memories will be accessed faster than memories associated with a system or global memory of a processing system. In such instances, registers such as TLB registers (implemented in hardware) may be accessed at hardware speeds directly by a processing core to perform the translation or mapping of logical to physical addresses.

As mentioned above, such a process may be performed by DPI-SSL program code that performs a DPI-SSL scan of information included in one or more packets associated with a particular connection. In such an instance functions associated with the DPI-SSL scan may include sending a request to access information in the SMV that includes a handle may be provided to the function associated with the DPI-SSL functions. This request for information may be associated with a maximum size. After this handle has been provided, the DPI-SSL functions may steer all sensitive data associated with this connection, whether that data be related to a static or ephemeral (time based) connection data to the SMV for translation. This maximum size associated with such an information request may typically be anywhere from 64K bytes-128K bytes. Additionally, this maximum size may be a function of whether a cache entry exists for this connection where keying material associated with this information that can be reused. For connections that can leverage caching, the size will tend to be smaller (64K bytes) and subsequent secure connection negotiations may use an abbreviated handshake when establishing the subsequent secure connection. In other instances, a connection that negotiates using a full handshake, the maximum size may be relatively higher, 128K bytes for example.

A method consistent with the present disclosure may receive an indication that a client device is initiating a secure connection with a computing device. After the initiation of the secured connection has begun, a first packet sent between the client device and the computing device via the secure communication connection may be received, a request to receive handle information associated with the secure communication connection may be sent, and the requested handle information may be received. Next a first packet sent between the client device and the computing device may be received via the secure communication connection, session keys and secure keying material related to the secure communication connection may be created, the created session keys and the secure keying material may be stored in a physical memory, where the created session keys and keying material stored in the physical memory are available to decrypt data included in subsequent data packets associated with the secure communication connection. After the session keys and keying material are stored in the physical memory, a new packet to send to the destination may be created from the data included in the first packet, where the newly created packet secures the data included in the first packet based at least in part on the created session keys, and the newly created packet may be allowed to be sent to a destination.

FIG. 1 illustrates an exemplary set of instructions that may be performed at a firewall. Step 105 of FIG. 1 identifies that a new secure connection is being formed. This new secure connection may be initiated with a TLS hello message sent from a client device when that client device attempts to establish a secure connection with a computing device. Next in step 110, a process executing at the firewall may request to receive a handle associated with the secure connection. This request may be generated by a set of code, such as a set of DPI-SSL code, at a firewall and this request may be sent to a piece of low level firmware or program code. Next in step 115, information relating to the handle request may be received. Step 115 may receive a handle from the low level program code, where this handle may be a descriptor similar to a file descriptor that associates the handle to a physical address and a size of memory. In certain instances the handle may be associated with a memory or register size measurable in bytes. The handle may be provided to a processing core that has been allocated to receive data packets related to the secure connection. The low level program code or other code may then program memory or registers (such as TLB registers) to include a set of information that cross-references the handle, a virtual memory, and a span of memory to a physical memory address and a span of physical memory. As such, program code at the firewall may receive information that may include the handle and other information in step 115 of FIG. 1.

Next in step 120, a packet associated with the secure connection may be received by a processing core and the handle associated with that connection may be provided that enables that processing core to access physical memory associated with that handle using a virtual or logical address. After step 120, the processor may access information stored in physical memory using the virtual address associated with the handle in step 125 of FIG. 1. A request to access physical memory may include the handle, the virtual address, and a length.

After step 125, the process may receive or have access to the information stored in the physical memory that is associated with the handle and with the virtual address in step 130. Next at step 135 data included in the received packet may be scanned to make sure that data included in that packet is not associated with a threat. The scanning of the data in the packet may be performed by a deep packet inspection (DPI) scanning software that executes at a different processing core than the processing core that received the handle. Information accessed in step 130 may include keys required to decrypt data included in the received data packet, where those keys may be used to decrypt encrypted packet data so that decrypted data can be scanned at the firewall.

After step 135, determination step 140 may identify whether data in the received packet is associated with a threat, when yes, program flow may move to step 145 that performs a corrective action. When step 135 does not identify a threat the secure packetized data, program flow may move to step 150 that identifies whether the secure connection is being terminated, when yes, program flow may move to step 165 where the secure connection is ended. When step 150 identifies that the secure connection is not being terminated, program flow may move from step 150 to step 120 where another secure packet associated with the secure connection may be received.

Figure 2:
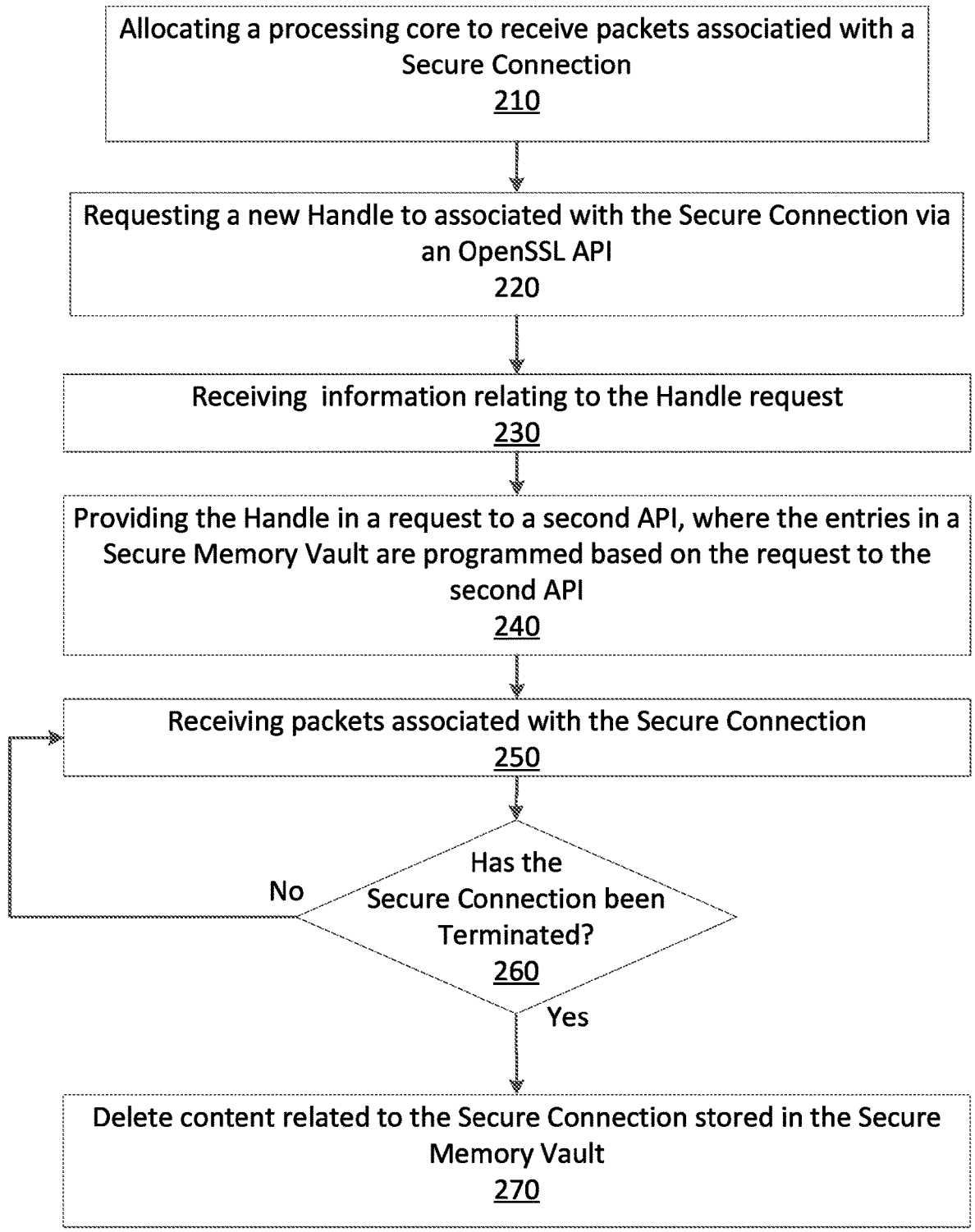
FIG. 2 illustrates a flow chart of program steps consistent with the present disclosure.

FIG. 2 illustrates a flow chart of program steps consistent with the present disclosure. Step 210 of FIG. 2 may allocate a processing core to received packets associated with a secure connection. After the processor has been allocated to receive packets associated with the secure connection, that processor may request a new handle from another set of program code. Here again, the processor may request this handle using a low level program code or firmware. This request may be performed via an OpenSSL application program interface (API). Next in step 230 the processor may receive information relating to the handle request. For example, a handle comprising a descriptor (or identifier) may be received by the processor. After step 230, the processor may provide a second request to receive information associated with the handle. For example, the processor may provide the second request to a second API that includes the descriptor/identifier and information in a secure memory vault may be programmed based on the second request. Here again information in the secure memory vault will be associated with or include the handle, a virtual memory address, a length, and a physical memory address.

After step 240, the processor in step 250 may receive and process packets associated with the secure connection. Determination step 260 may then identify whether the secure connection has been terminated, when yes, program flow may move to step 270 where content stored in the secure memory vault that is associated with the recently terminated secure connection may be deleted.

When step 260 identifies that the secure connection has not been terminated, program flow may move back to step 250 where additional packets associated with the secure connection may be received.

Each of the discrete processing cores in the multi-core system may be associated with one and only one data store that stores translation information relating to a single secure connection. This translation information is used by the hardware to translate a virtual address to a physical address.

The same virtual address in different data stores residing in different core may translate to a different physical address/memory. This is how different connections running on different cores may simultaneously use the same virtual address but act on different physical memory that is unique to each connection, even though these connections may share the same virtual address.

The method may receive an indication that a client device is initiating a secure connection with a computing device. After the initiation of the secured connection has begun, the local process may look to match some attributes of the client and server to create a connection fingerprint and then do a lookup in the local cache (maintained in DPI-SSL process) to see if there is a hit. If there is a cache hit, then the local process will typically use two handles—first handle is associated with a cache entry and represents data in physical memory that contains the keys (from a prior connection) that can be reused, the second handle is associated with new physical memory that is to be used for this new connection. By using the cache and the first handle that represents a cache entry in physical memory, the local process does not have to create new keying material for this connection. This improves latency and speeds up the secure connection handshake by abbreviating the negotiation between the client and a server.

Figure 3:
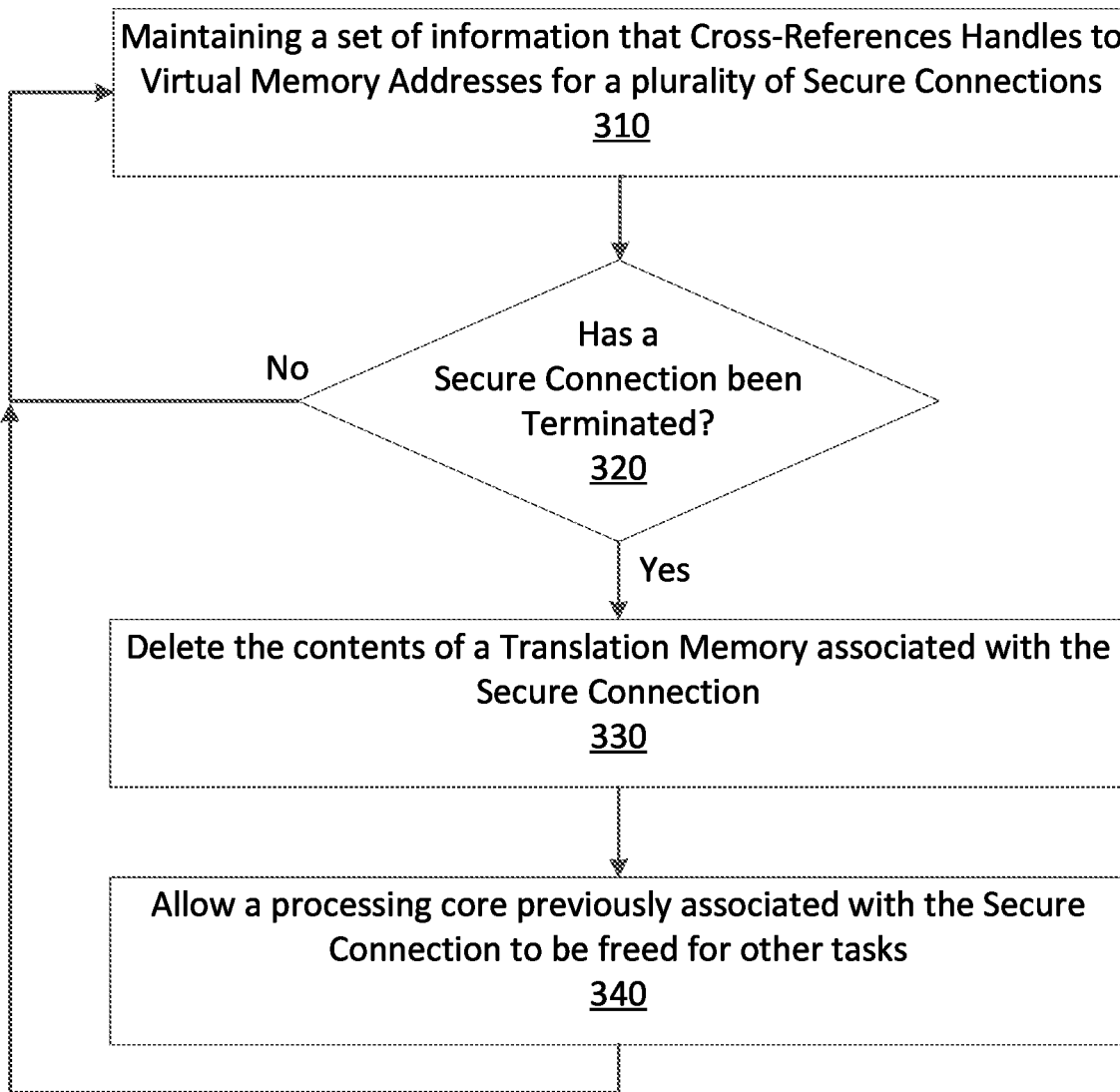
FIG. 3 illustrates steps that may be performed by a multi-processor system that receives packets from a plurality of secure connections.

FIG. 3 illustrates steps that may be performed by a multi-processor system that receives packets from a plurality of secure connections. In step 310 of FIG. 3 each of a plurality of processors in the multi-processor system may maintain information that relates to individual respective secure connections. Since each particular processing core in that multi-core system may each maintain information relating to a different single secure connection, a plurality of processing cores in that multi-core system can cumulatively store information that uniquely cross-references each of those handles to a particular respective virtual memory address, to a particular respective physical memory address, and to a particular respective secure connection. Furthermore, since each process maintains their own independent set of cross-reference information, no processor can access physical memory locations that store information relating to operations performed by another processor without generating a page fault.

As such, step 310 maintains a set of information that cross-reference handles to virtual memory address and to physical memory address that correspond to a set of independent secure connections because each of the plurality of processors of a multi-processor system maintains this information.

Next determination step 320 of FIG. 3 may identify that a particular secure connection has been terminated. When a particular secure connection has not been terminated, flow chart of FIG. 3 may move back to step 310 where the information that cross-references handles, virtual memory addresses, an physical memory address for the plurality of secure connections may be maintained by different processors independently.

Since each processor of a multi-core processor will typically only be allocated to a single secure connection, step 320 will typically be performed by the processor allocated to receive data packets associated with that particular single secure connection. After step 320, the processor that was allocated to receive data packets from that particular secure connection may delete the content of a translation memory (i.e. the content of a secure memory vault or TLB entries) that are associated with that particular secure connection in step 330 of FIG. 3.

Then after step 340, the process associated with the terminated secure connection may be freed to perform other tasks and the flow chart of FIG. 3 may move back to step 310, where the information that cross-references handles, virtual memory addresses, a physical memory address for the plurality of secure connections may be maintained by different processors independently.

Today many different processor architectures include hardware TLB registers. In fact common processor available today (x86, MIPS, and ARM) have TLB registers, where each type of processor may have a different number of TLB registers and where a single TLB entry may span numerous TLB registers. For example, the latest X86 include enough register space to store more than 2000 TLB entries (or somewhere between 2000 and 4000) and the Cavium MIPS processor includes enough TLB registers to store 128 to 256 TLB entries. A single TLB entry may be associated with a stating virtual address, a size, a corresponding physical address, access permissions, control permissions, and may include other information. In certain instances a virtual address may include 64 bits. As such, each single TLB entry may be used to covert particular virtual addresses into particular physical addresses when a particular process has permission to access a particular TLB entry.

Handles and associated translation information may be tuned according to hardware limitations or features associated with a particular type of hardware processing core. As such the program code that performs the task of assigning handles or related information may be bundled into a single firmware image that contains all of the software associated that executes at a firewall. Alternatively, program code assigned the task of assigning those handles or related information may be implemented in a driver module that loads when the firewall boots. In either case the program code associated with assigning those handles or related information may be tuned based on a type of processing core that a particular firewall uses, where that program code may be updated periodically as needed or desired.

Figure 4:
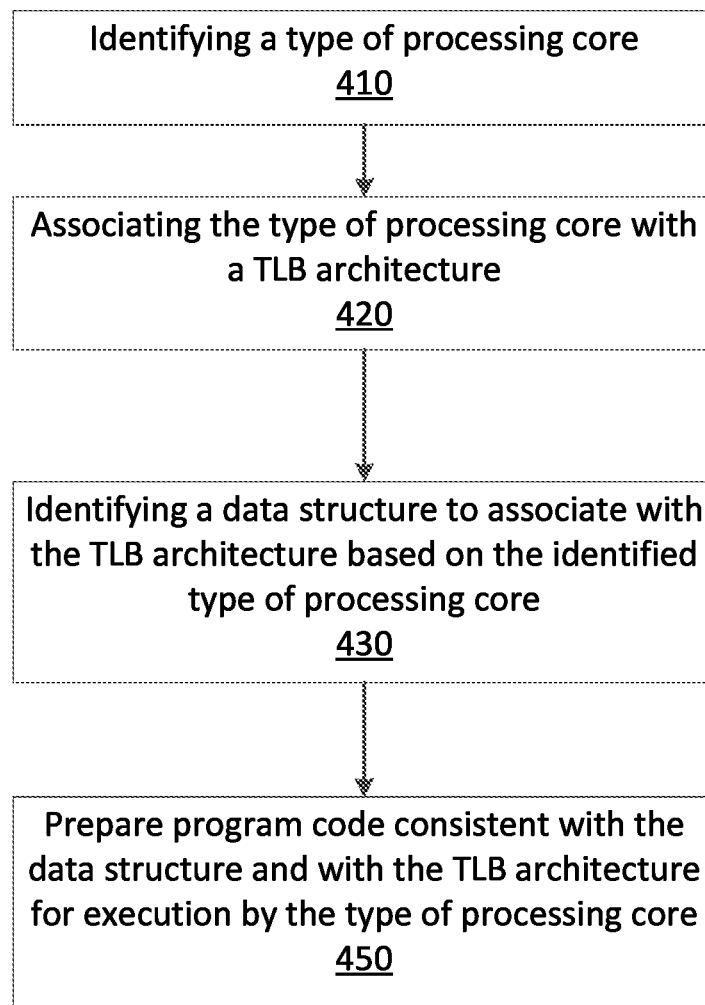
FIG. 4 illustrates a set of steps that may be performed when program code is tuned to execute on a particular type of processing core.

FIG. 4 illustrates a set of steps that may be performed when program code is tuned to execute on a particular type of processing core. Step 410 of FIG. 4 is a step where a type of processing core is identified, next in step 420 that type of processing core may be associated with a TLB architecture. Step 430 of FIG. 4 may then identify a data structure to associate with the TLB architecture based on the type of programming core identified in step 420. After step 430, step 440 of FIG. 4 may prepare program code consistent with the data structure and the TLB architecture for execution by the identified type of processing core.

An SMV consistent with the present disclosure may include information relating to a particular connection, TLS connection 1, for example. As such the SMV may include information that is unique for each respective TLS connection. In certain instances, a number of TLB entries stored in TLB registers associated with a plurality of connections may only map processes executing at a single processing core to a single TLB entry. In such an instance when a system manages many connections, for example 200,000 connections, that system may not be able to store TLB entries for all 200,000 connections at a single time. As such, systems managing a large number of connections may not store TLB entries in TLB registers located at that system for all of the connections at a single point in time. In such instances, a processing core located in that system may need to swap information into a set of TLB registers that when handling information relating to a particular connection.

Keys associated with the present disclosure may be static keys that do not change or may be ephemeral (temporal) keys that only last for a period of time. When a new secure connection is initiated between a client device accessing a server, a TLS handshake may be exchanged between the client device and a firewall and a corresponding TLS handshake may be exchanged between the firewall and the server. In certain instances, a deep packet inspection (DPI) software resident at the firewall may be used to scan secure information within a secure socket layer (SSL) such that DPI inspection on the SSL communications may be performed.

During an initial TLS/SSL handshake phase of a connection, a particular DPI-SSL process may request a new handle from the low level firmware. Here again this handle may include a virtual address and size that may be translated into memory addresses associated with a contiguous physical memory of some size (for example 96 KB, 128 KB, etc.). This handle maybe saved in meta-data associated with this connection along with the Logical/Virtual address that DPI-SSL will use to access this memory. In real-time, when a packet comes into a Firewall, existing implementations may parses the packet and make an association with an existing connection. This associated may include pointer meta-data that may be used as a connection reference when processing this packet. Subsequently, for any packets associated with this connection, the DPI-SSL process may obtain the associated handle from the connection meta-data. This handle may then be used when calling low level API so that access is granted to these physical memory locations that are associated with this connection. At this point in time, this DPI-SSL process can use its Virtual address to read/write into the physical memory locations associated with this particular DPI-SSL process. Once DPI-SSL determines access to this memory is needed, is may need to obtain any OpenSSL data associated with this connection. All packets containing encrypted data will need to be sent to an OpenSSL process for TLS operations such that the DPI-SSL application can call the low level API using the handle as long as read/write access has been granted to the corresponding physical memory. This low level routine may uses this handle to program the TLB registers of a particular processor core with an address X and a size Y that results in that processing core being allowed to access to this memory location. In such an instance a DPI-SSL process executing on that processing core may be allowed to access physical memory that is associated via the handle. That particular processing core may the access physical memory via the handle and a Virtual Address V and size Y. In such an instance, the low level routine that programs the TLB registers could be bundled into a single firmware image that contains all of the software running on a Firewall (including DPI-SSL, etc.) or be loaded during Firewall boot-up/initialization process as a separate driver module.

DPI-SSL will typically maintain a handle (i.e. handle H) and a virtual address (i.e. virtual address V), a size (i.e. Y bytes), where low-level firmware may maintain an association of Handle H with Physical Address X, size Y after relevant TLB registers have been programmed. After those relevant TLB registers have been programmed, an enabled processing core will be able to access (read/write to) memory starting at a memory address associated with virtual address V up to a memory address associated with virtual address V+Y. As such, this DPI-SSL process will be enabled to read or write to physical memory addresses X to X+Y. When DPI-SSL or another application/software tries to access [V to V+Y], the secure memory containing keys without TLB being programmed to allow such access, a page fault exception will result in hardware. Note that in such instances, virtual address V is mapped to physical address X, where both virtual address V and physical address X are both associated with a number of memory locations as indicated by size Y. This is true even when an unauthorized process has knowledge of keys related to a secure memory access.

Programming of TLB hardware registers may be performed via an update to a dynamic TLB entry associated with a particular processor core that is unique per processing core. Because of this, the programming of the TLB registers for that particular processing core will enable access to memory locations in an SMV that are only accessible by that particular processing core. Once an OpenSSL API returns to the caller (DPI-SSL, for example), DPI-SSL may then call a different API with the same handle that may result in hardware (dynamic TLB entry for that specific processing core) being programmed to lock access to memory locations in the SMV associated with this handle. Thus, even different software modules (TCP, IP, DPI, Content Filtering, etc.) associated with this connection will not have access to any TLS sensitive data, including session keys and keying material associated with that secure connection. By limiting access to secure information associated with a connection to a single processing core dedicated to handling operations relating to that particular connection, other processing cores performing tasks that do not require access to the secure information for that connection may be performed by those other processing cores without those other processing cores being able to access the secure information relating to that connection. For example, when a first processor has access to sensitive TLS data for a first connection, other processors performing tasks associated with that first connection will have not have access to the sensitive TLS data for the first connection. Because of this these other processors may perform processes relating to a transfer control protocol (TCP), internet protocol (IP) transfers, deep packet inspection (DPI) scanning, content filtering, or other processes that do not require the sensitive TLS data to perform their function.

Each of the aforementioned exemplary 200,000 connections will have an associated handle, but at any time, the number of TLBs programmed for access to this secure memory will typically be a function of number of processing cores. As mentioned above, each processing core has a dedicated/independent set of TLB entries that typically include, depending on a particular CPU design, somewhere between 128-2000 entries.

As mentioned above TLB entries may be statically programmed or be dynamically programmed. Static TLB programming is where TLB entries are programmed once and are not changed, hence, they are "static." This allows all memory to be accessible with certain limitations, which may allow programs or program code to only have read access, where stored data may typically be read and overwritten (written to).

In contrast, dynamic TLB programming relates to programming some TLB entries are programmed at run-time with different addresses, as such, dynamic TLB entries can be changed while program code executes after they have those entries have been programmed a first time.

In contrast to the methods and apparatus discussed in this disclosure, methods or systems that program TLB registers associated with a processing core may only be statically programmed. Methods and systems consentient with the present disclosure may identify a number of TLB entries that may be dynamically programmed at run-time. For example, when some number of TLB entries are allowed to be dynamically programmed, when DPI-SSL calls the low level API with a specific handle, the low level API will program this TLB entry with a Virtual/Logical address "V" and a size "Y," an associated physical address "X," the size "Y," and relevant permissions that enable a particular core to access these memory locations. At this point, DPI-SSL may be the only application running on this core and it will have access to these memory locations. Once DPI-SSL is done with the TLS operations, DPI-SSL will release the handle via the low level API, which will result in the TLB entry being reprogrammed. Subsequently, DPI-SSL after it is done with processing of a packet can relinquish the CPU core for use by other processes.

Since a given TLB entry may only be accessible by one processing core of a number of processing cores, the number of TLB accesses performed at a given moment in time may be limited to a number of CPU cores in a system. In an instance where a system has 32 processor cores, DPI-SSL could potentially run on some or all of these 32 cores at any time. So, at any point in time, packets associated with 32 DPI-SSL connections can run concurrently on a Firewall, even though there may be 200,000 active DPI-SSL connections. DPI-SSL running on a particular core may call the low-level API to dynamically reprogram the number of allowed TLB entries associated with a processing core. Note that each core has an independent set of TLB entries. So, only 1 DPI-SSL connection per CPU core at any point in time has access to its secure memory (via a handle) programmed in TLB, as such, 32 cores implies that up to 32 TLB entries may be dynamically programmed at a single time. Note that this architecture guarantees that a particular processing core can only access secure memory associated with a particular DPI-SSL connection, without allowing that particular processing core to have access to another connection's secure memory.

The more memory or TLB registers that are available for use by a processor implementing functions consistent with the present disclosure, the more granular the size of a memory associated with a particular connection can be made. An amount of memory associated with a handle may vary based on limitations associated with a particular type of processing core and the size of a TLB associated with that processing core, for example. Depending on programming options/requirements associated with certain specific central processing units (CPU) processing cores, an amount of TLB register space may be allocated to storing secure connection based information consistent with the present disclosure. While it is anticipated that an amount of memory used for storing information relating to a particular connection may vary, methods and apparatus consistent with the present disclosure may use different amounts of TLB memory for storing information for that particular connection. While it is anticipated that a given TLB entry may span 64 KB, 96 KB, or 128 KB, a given TLB entry may be of any size including, yet not limited to (16 KB, 32 KB, 64 KB, 96 KB, 128 KB, or more).

When TLB registers associated with a particular processing core are used to store memory translation information, that particular processing core may access its TLB registers directly via hardware associated with that particular processing core. Because of the, the accessing of those TLB registers by that particular processing core can occur with little latency. This enables this processing core to access physical memory very efficiently as the translation of virtual to physical addresses occurs at hardware speed.

Unique aspects of the present disclosure enable a processing system to 1. Limit access to secure connection information based on identifying that a memory request to secure memory belongs to a specific connection that is associated with a single specific processing core at any moment in time; 2. Allows translation memory (like TLB registers) to be programmed in a manner that locks access to physical memory locations that store secure connection information only when secure operations need to be performed; and 3. Allows an algorithm in a program (such as DPI-SSL) to manage all secure memory requests (such as OpenSSL memory requests), where this management allows access to physical memory in a secure way. As such a program, such as DPI-SSL may allow a particular processing core to allocate memory, free memory, or access memory without while preventing other processes performed by other processes from accessing secure physical memory that is associated with a particular connection.

Thus, even different software modules (TCP, IP, DPI, Content Filtering, etc) associated with this connection do not have access to any TLS sensitive data, including session keys and keying material. When DPI-SSL software needs to perform TLS operations by invoking OpenSSL APIs, DPI-SSL application may invoke a firmware API with the corresponding handle because OpenSSL needs to use the Keys for encrypt/decrypt operations. The firmware API may be implemented in a lower layer module that is different from DPI-SSL, this is to ensure a separate implementation boundary responsible for granting/terminating access to SMV. In such instances this lower layer module will program the hardware to grant temporary access to SMV for the caller of the API. Programming the hardware may e done via update to a dynamic TLB entry in CPU that is unique per core, this may enable access to memory locations in SMV. Once the OpenSSL API returns to the caller (DPI-SSL), DPI-SSL may then call a different API with the same handle that results in hardware (dynamic TLB entry in CPU) being programmed to lock access to memory locations in the SMV associated with this handle. Thus, even different software modules (TCP, IP, DPI, Content Filtering, etc) associated with this connection do not have access to any TLS sensitive data, including session keys and keying material.

Figure 5:
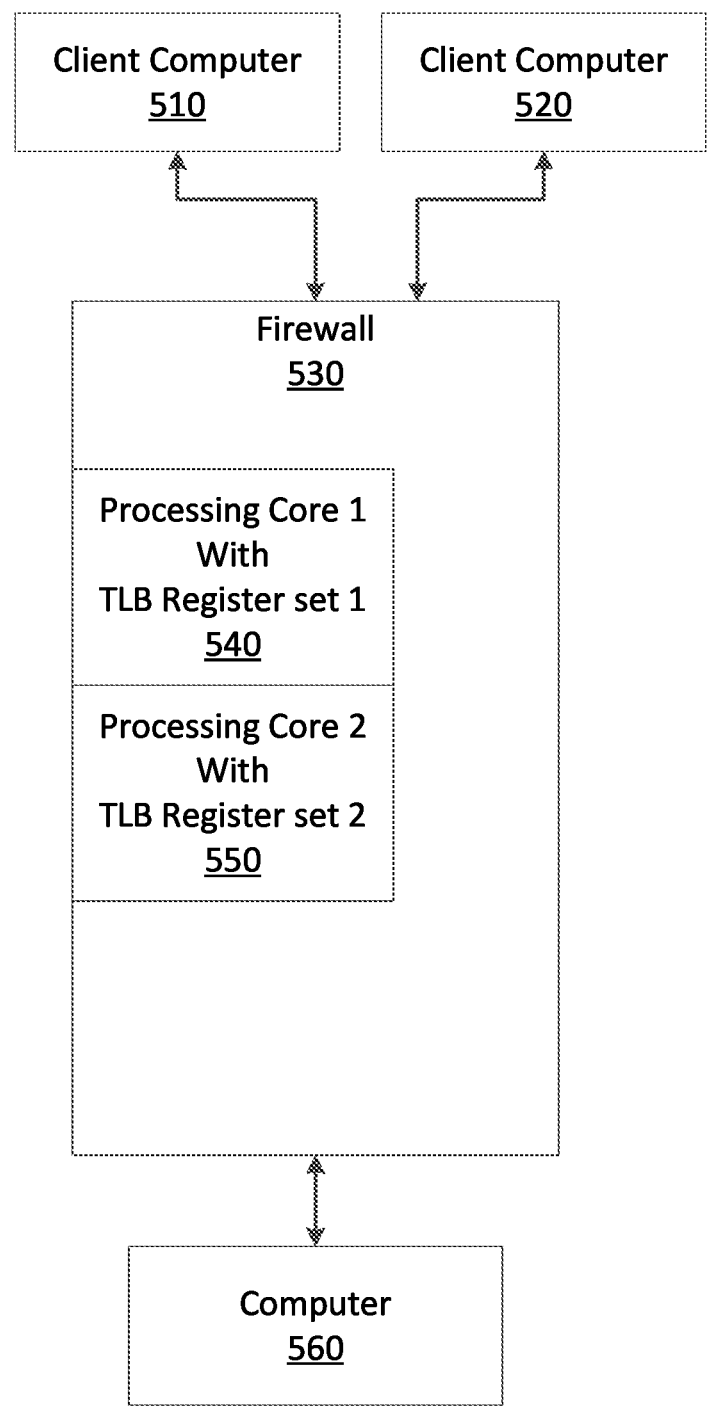
FIG. 5 illustrates a firewall communicating with client device and with a computer.

FIG. 5 illustrates a firewall communicating with client device and with a computer. Note that client computer 510 and client computer 520 may each initiate different secure connections with computer 550 via firewall 520 using methods consistent with the present disclosure. Note that firewall 530 includes processing core 1 and TLB register set 1 540. Firewall 530 also includes processing core 2 and TLB register set 2 550. Note that secure operations associated with client computer 510 may be performed by processing core 1 and that secure communications associated with client computer 520 may be performed by processing core 2. When secure operations associated with client computer 510 are performed by processing core 1 accessing TLB register set 1, processing core 2 may not be able to access information stored in TLB register set 1 because TLB register set 1 is physically coupled to processing core 1 and not to processing core 2. This topology provides greater security when each processing core stores information relating to a single connection. For example, when processing core 1 stores information relating to a first secure connection in its local TLB registers, processing core 2 will not be able to access data relating to the first secure connection stored TLB register set 1 because processing core 2 is not physically coupled to TLB register set 1. Similarly, processing core 1 will not be able to access information stored in TLB register set 2 that is coupled to processing core 2. As such, only one processing core may be able to access secure information relating to a particular connection.

Methods consistent with the present disclosure may also partition physical memory storing connection information in a non-contiguous manner. Architectures consistent with the present disclosure may prevent a first processing core from accessing physical memory associated with a second processing core by generating a page fault if the first processing core attempts to access a physical memory location associated with another processing core. Even if malicious code were somehow able to inhibit such a page fault from being generated, that malicious code would not be aware of what memory locations in physical memory actually store secure information. Because of this, the partitioning of physical memory in a non-contiguous manner may help increase security.

Figure 6:
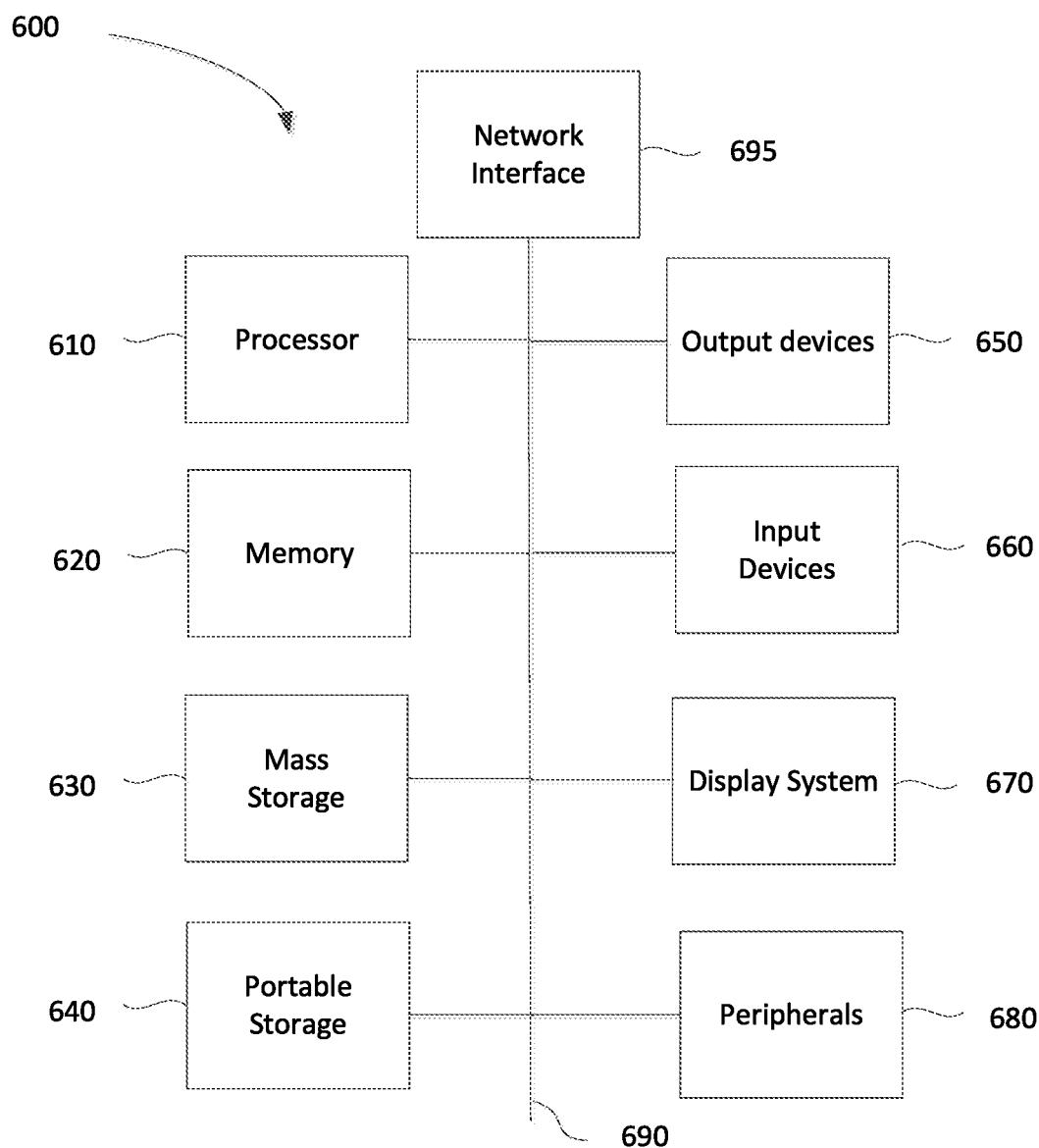
FIG. 6 illustrates a computing system that may be used to implement an embodiment of the present invention.

FIG. 6 illustrates a computing system that may be used to implement an embodiment of the present invention. The computing system 600 of FIG. 6 includes one or more processors 610 and main memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, peripheral devices 680, and network interface 695.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a FLASH memory, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD), a plasma display, an organic light-emitting diode (OLED) display, an electronic ink display, a projector-based display, a holographic display, or another suitable display device. Display system 670 receives textual and graphical information, and processes the information for output to the display device. The display system 670 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 680 may include any type of computer support device to add additional functionality to the computer system. For example, peripheral device(s) 680 may include a modem or a router.

Network interface 695 may include any form of computer interface of a computer, whether that be a wired network or a wireless interface. As such, network interface 695 may be an Ethernet network interface, a BlueTooth™ wireless interface, an 802.11 interface, or a cellular phone interface.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 600 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, FLASH memory, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for securely accessing data, the method comprising:
    storing a first set of translation data at a first data storage device separate from a system memory that is physically accessible only by a first processor of a multi-processor system, the first set of translation data associated with a first connection, wherein the first set of translation data maps a first virtual address to a first physical memory location that is only accessible to the first processor while servicing the first connection;
    storing a second set of translation data in a second data storage device separate from the system memory that is physically accessible only by a second processor of the multi-processor system, the second set of translation data associated with a second connection, wherein the second set of translation data maps a second virtual address to a second physical memory location that is only accessible to the second processor while servicing the second connection;
    accessing the first physical memory location that stores data associated with the first connection by the first processor, the first physical memory location accessed after the first processor translates the first virtual address to a first physical memory address using the first data storage device, wherein data stored at the first physical memory address is secured based on the first set of translation data being accessible only by the first processor;
    accessing the second physical memory location that stores data associated with the second connection by the second processor, the second physical memory location accessed after the second processor translates the second virtual address to a second physical memory address using the second data storage device, wherein data stored at the second physical memory address is secured based on the second set of translation data being accessible only by the second processor;
    securely communicating with a first destination associated with the first connection after accessing the first physical memory address; and
    securely communicating with to a second destination associated with the second connection after accessing the second physical memory location.

2. The method of claim 1, wherein the first virtual address and the second virtual address are a same virtual address that are respectively translated to the first physical memory address and the second physical memory address.

3. The method of claim 1, wherein the first data storage device is associated with a first type of processor and a number of translation entries stored at the first data storage device correspond to the first type of processor.

4. The method of claim 1, wherein program code associated with the first set of translation data is included in a set of firmware.

5. The method of claim 1, wherein program code associated with the first set of translation data is included in a software driver.

6. The method of claim 1, further comprising:
    identifying that the first processor of the multi-processor system corresponds to a first type of processing core; and
    assigning a number of translation entries to associate with the first set of translation data based on the identification that the first processor corresponds to the first type of processing core.

7. The method of claim 6, further comprising identifying a size of the first data storage device, wherein the number of translation entries corresponds to the identified size of the first data storage device.

8. The method of claim 6, further comprising identifying a data structure to associate with the first set of translation data.

9. The method of claim 1, further comprising assigning a first entry of the first set of translation data to associate with the first virtual address with the first physical memory address, access permissions, and control permissions.

10. The method of claim 9, wherein the first entry is also associated with a size.

11. The method of claim 1, further comprising assigning a first entry of the first set of translation data to an access permission.

12. The method of claim 1, further comprising assigning a first entry of the first set of translation data to a control permission.

13. A non-transitory computer-readable storage medium having embodied thereon a program executable by processor to perform a method for securely accessing data, the method comprising:
    storing a first set of translation data at a first data storage device separate from a system memory that is physically accessible only by a first processor of a multi-processor system, the first set of translation data associated with a first connection, wherein the first set of translation data maps a first virtual address to a first physical memory location that is only accessible to the first processor while servicing the first connection;
    storing a second set of translation data in a second data storage device separate from the system memory that is physically accessible only by a second processor of the multi-processor system, the second set of translation data associated with a second connection, wherein the second set of translation data maps a second virtual address to a second physical memory location that is only accessible to the second processor while servicing the second connection;
    accessing the first physical memory location that stores data associated with the first connection by the first processor, the first physical memory location accessed after the first processor translates the first virtual address to a first physical memory address using the first data storage device, wherein data stored at the first physical memory address is secured based on the first set of translation data being accessible only by the first processor;
    accessing the second physical memory location that stores data associated with the second connection by the second processor, the second physical memory location accessed after the second processor translates the second virtual address to a second physical memory address using the second data storage device, wherein data stored at the second physical memory address is secured based on the second set of translation data being accessible only by the second processor;

securely communicating with a first destination associated with the first connection after accessing the first physical memory address; and securely communicating with a second destination associated with the second connection after accessing the second physical memory location.

14. The non-transitory computer-readable storage medium of claim 13, wherein the first virtual address and the second virtual address are a same address that are respectively translated to the first physical memory address and the second physical memory address.

15. The non-transitory computer-readable storage medium of claim 13, wherein the first data storage device is associated with a first type of processor and a number of translation entries stored at the first data storage device correspond to the first type of processor.

16. The non-transitory computer-readable storage medium of claim 13, the program further executable to:

identify that the first processor of the multi-processor system corresponds to a first type of processing core; and assign a number of translation entries to associate with the first set of translation data based on the identification that the first processor corresponds to the first type of processing core.

17. The non-transitory computer-readable storage medium of claim 16, the program further executable to identify a size of the first data storage device, wherein the number of translation entries corresponds to the identified size of the first data storage device.

18. The non-transitory computer-readable storage medium of claim 16, the program further executable to identify a data structure to associate with the first set of translation data.

19. An apparatus for securely accessing data in a multi-processor system, the apparatus comprising:

a first processor of that executes stored instructions;

a first storage device separate from a system memory that is physically accessible only by the first processor that stores a first set of translation data, the first set of translation data associated with a first connection from which data is sent and received, wherein:

the first processor securely accesses data at a first physical memory location that stores data associated with the first connection, the data securely accessed based on the first storage device only being accessible by the first processor, and the first physical memory location is accessed after the first processor translates a first virtual address to a first physical memory address only accessible to the first processor while servicing the first connection;

a second processor that executes stored instructions; and a second storage device separate from the system memory that is physically accessible only by the second processor that stores a second set of translation data, the second set of translation data associated with a second connection from which data is sent and received, wherein:

the second processor securely accesses data at a second physical memory location that stores data associated with the second connection based on the second storage device being accessible only by the second processor, and the second physical memory location accessed after the second processor translates a second virtual address to a second physical memory address only accessible to the second processor while servicing the second connection.

20. The apparatus of claim 19, further comprising a system memory that stores the stored instructions executed by the first processor and by the second processor.

* * * * *